United States Patent [19]
Zakhidov et al.

[11] 3,918,303
[45] Nov. 11, 1975

[54] CALORIMETER
[76] Inventors: Romen Abdullaevich Zakhidov, Preobrazhenskaya ulitsa, 5/7, kv. 22; Dmitry Ivanovich Teplyakov, Molodezhnaya ulitsa, 4, kv. 256, both of Moscow, U.S.S.R.
[22] Filed: July 3, 1972
[21] Appl. No.: 268,756

Related U.S. Application Data
[63] Continuation of Ser. No. 87,312, Nov. 5, 1970, which is a continuation of Ser. No. 696,564, Jan. 9, 1968, abandoned.

[52] U.S. Cl............................................. 73/190 R
[51] Int. Cl. ........................................... G01k 17/00
[58] Field of Search ............... 73/190, 355; 250/338

[56] References Cited
UNITED STATES PATENTS
3,464,267  9/1969  Ehrlich et al. ........................ 73/190
3,487,684  1/1970  Shifrin ................................. 73/190

Primary Examiner—Herbert Goldstein
Attorney, Agent, or Firm—Waters, Schwartz & Nissen

[57] ABSTRACT
A calorimeter including a cylindrical shell in which is slidably supported a piston, the shell and the piston each being provided with independent passageways for channeling independent cooling mediums, and means for independently measuring the exit temperature of each of the cooling mediums.

2 Claims, 1 Drawing Figure

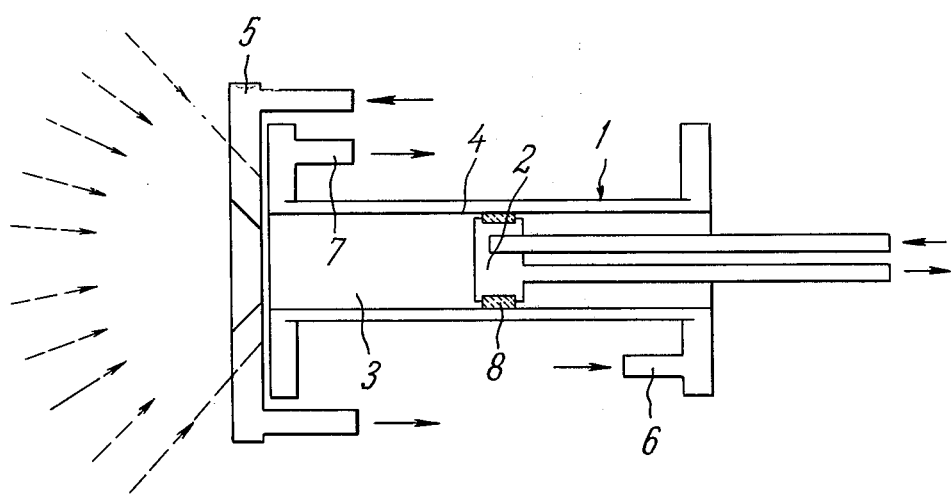

CALORIMETER

This application is a continuation of Ser. No. 87,312 filed Nov. 5, 1970, which in turn was a continuation of Ser. No. 696,564 filed Jan. 9, 1968 and now abandoned.

The invention relates to heliotechnics and heat engineering and, more particularly, to calorimetric devices used for measuring radiant fluxes.

Known in the present state of the art are calorimeters for measuring radiant fluxes. The calorimeters are essentially bottomed cylindrical shells (cf. e.g., a symposium entitled "Heat installations for utilizing solar energy", ed. by V. A. Baum, prof., D.Sc. (Tech.), "Nauka" Publishing House, Moscow 1966). The bottom of such a calorimeter is made integral with the cylindrical wall of the shell, both the bottom and the wall having a common cooling system.

A disadvantage inherent in the known calorimeters is that they are capable of measuring only an integral thermal value, i.e. the amount of heat flowing into the inner space thereof, but fail to determine the value of radiant fluxes falling upon every particular element of the wall confining the space.

It is an object of the present invention to eliminate the disadvantage mentioned above.

It is a specific object of the present invention to provide a calorimeter capable of determining local values of radiant fluxes.

Said object is accomplished since in the calorimeter of the present invention the bottom of its shell is made as a piston travelling within the cylindrical space of the calorimeter, the walls of the shell and the bottom being provided with cooling systems functioning independently of each other.

Given below is a description of an exemplary embodiment of the present invention with due reference to the accompanying drawing, wherein the sole figure is a diagrammatic illustration of the calorimeter according to the invention.

As it can be seen from the drawing, the calorimeter comprises a cylindrical shell 1 whose bottom is made as a piston 2 which is free to travel within a cylindrical space 3 defined by the wall 4 of the shell 1, and a water-cooled diaphragm 5 fitted over the shell 1 with the help of a thermal-insulating gasket which protects the outer walls of the shell 1 against radiant fluxes. The above-said components are made of red copper. The wall 4 and the piston 2 are provided with cooling systems independent of each other and having individual inlets 6 and outlets 7.

The piston 2 is protected with a thermal-insulating gasket 8 to preclude heat transfer from the piston to the wall 4. The gasket 8 serves also as the guide element. The surface of both the wall 4 and the piston 2 is blackened by any conventional method in order to determine the thermal characteristics of an incident radiant heat flux without regard for reflection.

"For this purpose it is sufficient to employ a coating which provides substantially total absorption of the incoming radiation".

The calorimeter of the present invention functions as follows. The piston 2 is made to travel gradually throughout the cylindrical space 3, the value of thermal energy inflow to the wall 4 of the shell 1 being sensed at every appropriate position assumed by the piston 2. The thermal energy inflow is measured by conventional means, forming no part of the present invention, which measurement is dependent upon the rise in temperature of the cooling agents. Specifically, there are temperature sensing means at inlet 6 and outlet 8 to measure the temperature of the cooling fluid to enable the difference to indicate the heat absorbed by the wall 4 for various positions of the piston. The results obtained allow the relationship $Q=Q(z)$ to be derived, said relationship being the initial one for determining the distribution of the radiant flux density along the wall 4 of the shell 1:

$$E = \frac{1}{2\pi\epsilon} \cdot \frac{dQ}{dz},$$

where
- $r$ denotes the radius of the cylindrical space,
- $z$ stands for the variable depth of the cylindrical space, and
- $Q$ symbolizes the value of thermal energy inflow to the wall of the cylindrical space for various values of $z$.

The calorimeter described hereinabove may find application in such installations and apparatus as solar furnaces, arc-type reverberatory stands and solar energy power installations.

It is obvious now that in the majority of cases cavity radiation receivers are an expedient to be employed in lieu of plane-type receivers because of the higher efficiency of the former. When used under specific conditions (e.g. in thermoelectric or thermionic converters utilizing solar radiation energy), cavity receivers prove to be more effective due to an increased uniformity of energy distribution over the radiant-heat absorbing surface of the receiver. The purpose of optimizing the parameters of the radiation receiver requires on experimental determination of the way thermal energy is distributed along the walls of the space. The calorimeter proposed in the invention can be effectively used for achieving the purpose. As an example of how the calorimeter is used for optimization of a radiation receiver, reference is made to pages 16–18 of "Heliotechnology" No. 2 Tashkent 1966.

What we claim is:

1. In a calorimeter for measuring radiant flux density: a cylindrical shell having an inner surface; a slidable piston in said shell constituting a bottom therefor, said inner surface and piston being substantially totally heat absorbent; means insulating the shell and piston against heat transfer therebetween; means to pass radiant flux into the shell for absorption by the inner wall thereof while protecting the outer wall thereof against the incidence of radiant flux; a cooling system for said shell to absorb heat received by the shell by the radiant flux; a separate cooling system for said piston; and temperature sensing means connected to the cooling system for the shell to measure change in temperature thereof due to heat absorption from the shell.

2. A calorimeter as claimed in claim 1 wherein said means for passing radiant flux to the shell while protecting the outer wall thereof comprises a water cooled diaphragm on said shell, said means insulating the shell and piston comprising a thermally insulating gasket between said piston and shell.

* * * * *